United States Patent [19]

Klinkenberg et al.

[11] Patent Number: 5,136,233

[45] Date of Patent: Aug. 4, 1992

[54] MEANS AND METHOD FOR CONTROLLING ELECRICAL TRANSFORMER VOLTAGE REGULATING TAPCHANGERS

[75] Inventors: Jerry R. Klinkenberg; Alwin C. Dueker, both of Davenport, Iowa

[73] Assignee: Iowa-Illinois Gas and Electric Company, Davenport, Iowa

[21] Appl. No.: 682,911

[22] Filed: Apr. 9, 1991

[51] Int. Cl.⁵ .................................................. G05F 1/20
[52] U.S. Cl. .................................... 323/343; 323/255; 323/257; 323/758; 323/340
[58] Field of Search ............... 323/255, 256, 257, 258, 323/340, 341, 343; 307/31, 35, 39

[56]  References Cited

U.S. PATENT DOCUMENTS

| | | | |
|---|---|---|---|
| 2,772,369 | 11/1956 | Pinney | 307/58 |
| 3,252,078 | 5/1966 | Conner | 323/43.5 |
| 3,423,657 | 1/1960 | Ponstingl | 318/33 |
| 3,818,321 | 6/1974 | Willner et al. | 323/258 |
| 4,419,619 | 12/1988 | Jindrick et al. | 323/257 |
| 4,623,834 | 11/1986 | Klingbiel et al. | 323/257 |
| 4,630,220 | 12/1986 | Peckinpaugh | 323/257 |
| 4,695,737 | 9/1987 | Rabon et al. | 323/257 |
| 4,733,158 | 3/1988 | Marchione et al. | 323/258 |
| 4,816,738 | 3/1989 | Nicolas | 323/258 |
| 4,860,145 | 8/1989 | Klingbeil | 323/257 |

OTHER PUBLICATIONS

Substation Control & Protection Project: System Requirements Specifications By Westinghouse Electric Corp. Project 1359-1 EPRI EL-6592, Nov. 1989.

Primary Examiner—Peter S. Wong
Attorney, Agent, or Firm—Zarley, McKee, Thomte, Voorhees, & Sease

[57]  ABSTRACT

An apparatus and method for controlling tapchanger operation on voltage regulating transformers includes a plurality of transducers to obtain real time voltage, wattage and reactive power readings, along with status readings for breakers associated with circuitry. A processor includes components to convert the analog transducer signals to digital signals, and process those signals utilizing preprogrammed and predetermined multipliers. A processor can read programmable files that dictate operational set points and ranges of set points. The software program allows evaluation of the real time actual parameter readings in comparison with set point and range set points to issue instructions to change the tapchangers on the transformers to maintain control of and regulate the voltage from the transformer. Other features and advantages are described herein.

30 Claims, 6 Drawing Sheets

Fig 7

MEANS AND METHOD FOR CONTROLLING ELECRICAL TRANSFORMER VOLTAGE REGULATING TAPCHANGERS

BACKGROUND OF THE INVENTION a. Field of the Invention

The present invention relates to regulation of voltage from one or more electrical power substation transformers, and in particular, to control of voltage regulating tapchangers on substation transformers.

b. Problems in the Art

Electrical power generated in utility power plants has to be stepped down in voltage for residential and commercial use. Electrical power is most efficiently supplied to diverse locations by sending high voltage of many thousands of volts through supply transmission lines.

Electrical distribution substations are placed in scattered locations and contain transformers necessary to reduce transmission grid voltage (generally several thousands to tens of thousands of volts) to standard residential and commercial levels. The voltage also needs to be rather closely regulated to insure uniformity and reliability in light of the many and varied electrical loads which exist from moment to moment in residential and commercial uses.

Conventionally in the United States, residential voltage levels are around 110 VAC. Commercial voltage is usually around 220 VAC. Government standards require these voltages be maintained within approximately plus or minus 5 percent of these standards at all times.

It must be appreciated that conversion of what will be called the very high transmission or supply voltage to the substantially lower distribution voltage, with such precise regulation, depends not only on accurate transformers and associated equipment, it also depends on the varying conditions that can exist from moment to moment in electrical power distribution systems. For example, at times residential electrical power use can collectively increase in amount so that the collective load on the distribution lines causes the collective voltage to drop below acceptable limits. A well known example of such a situation is during hot weather periods where widespread and long usage of air conditioning can cause peak loading on a distribution system.

Another factor that comes into account is a fluctuation in supply voltage. This can be caused by a variety of factors at the power utility itself. It can result in a fluctuation in supply voltage to the substation transformers, which in turn can affect distribution voltage. Other factors and situations come into play which can affect accurate regulation of distribution voltage.

The regulation of output voltage from power transformers has been a requirement since the beginning of the electrical age. One well-known in the art method is to alter the position at which an output from one winding of the transformer is taken. The ratio of turns of that winding (usually the "secondary winding"), as compared to the other winding (usually called the "primary winding") can be altered, in turn altering the voltage "transformation" between primary and secondary windings.

A conventional structure to allow such alterations is to provide a plurality of terminals or "taps" along the winding. A translatable terminal is moveable with respect to the taps allowing selection of a desired tap.

Mechanisms to accomplish this function are generally called "tapchangers". As load on the distribution line increases, more supply voltage is needed to be "transformed" or presented by the transformer on the distribution side. By monitoring distribution line voltage, when a drop occurs, the tapchanger can be instructed to move to a tap that will send more voltage down the distribution line, to keep the voltage within the required range. Several generations of tapchanger controls have been developed to achieve this end.

The first voltage regulation system of this type was manually controlled by an operator who, through mechanical cranks or later electrical switches, could use his/her judgment as to when to operate tapchangers to change the distribution voltage to the customers of the utility.

The Ponstingl U.S. Pat. No. 3,423,657 is typical of electromechanical methods of control tapchangers. Its method uses older style tapchanger controls and hardware wiring to determine, through very limited intelligence, how to properly operate a furnace transformer. While the device does control a tapchanger to a manually selected control point, the device will not automatically allow for changing loads or operate multiple transformers. This system has severe limitations in utility substation applications.

The Pinney U.S. Pat. No. 2,777,369 describes a method of paralleling three transformers using a series of electromechanical controls and motor driven cam switches. The system sets up a master control and several follower controls. By monitoring circulating current, the combination of controls allows the paralleling of transformers. This design makes no calculation or use of reactive power. The electrical system is not monitored for switching conditions. The Pinney patent requires a control apparatus for each transformer. The controls do not provide alarming or lock-out functions. These factors represent deficiencies when applied to efficient operation of tapchangers in utility substations. A significant problem encountered when connecting substation transformers in parallel is that differences in impedances between transformers (however slight) can result in one supplying more load. This loading imbalance can also occur if one transformer supplies more load from the buses which interconnect the elements of the system. This is a significant reason why such transformers must be monitored and regulated.

Typical of many present conventional tapchanger controls is the L. E. Conner control of U.S. Pat. No. 3,252,078. This control uses various electronic setpoints to monitor voltage and make tapchanger adjustments. The control directly monitors voltage and current to arrive at a setpoint voltage and adjust the operating point according to load. However, the control does not provide any paralleling options. It does not perform self diagnostics or high/low voltage limit checking. The control cannot operate more than one tapchanger nor provide alarming for erroneous sensors or malfunctions.

Newer technology is utilized in the Jindrick invention of U.S. Pat. No. 4,419,619. The Jindrick control uses a microprocessor to scan the voltage and current of a transformer in order to regulate the voltage. The invention uses a dedicated control and software stored in read only memory to calculate and derive the voltage setpoint and bias it according to load. However, the control system parameters are varied by control dials which lose accuracy over time.

Patents such as Jindrick show that attempts continue to be made to improve the way voltage regulating tapchangers can be controlled at transformers for substations. While Jindrick does reveal the use of microprocessing technology with its type of control system, it has certain deficiencies or utilizes structure or methods which leave room for improvement in the art. The above-mentioned patents can be referred to regarding the basic subject matter of power transformers, tapchangers, and tapchanger controls.

Conventional state-of-the-art tapchangers are controlled by electromechanical or discrete electronic devices. They depend quite heavily on components which are subject to deterioration or change in operation. It is also to be understood that many tapchanger control systems require individual control hardware for each tapchanger of each transformer. Significant resources have to be expended to calibrate and maintain the mechanical and electronic controls over time for each transformer.

Quite simply, transformers and tapchanger controls age over time. As a result, accurate and reliable control of the transformers can become difficult. Damage to components may cause erratic and unreliable readings or operations. This in turn would most times require replacement of the entire system, at a very substantial cost.

Moreover, such structure can result in unreliable voltage regulation which in turn can cause customer dissatisfaction as well as result in costly expenditure of resources for maintenance.

A real need therefore exists in the art to provide a tapchanger control system which does not require complete replacement of existing tapchanger structure. The need exists for a control system which not only can accommodate changes over time in the performance of electrical and mechanical components, but also indicate when a failure or error occurs in one of the components.

Additionally, for power utilities, there is a need to maintain uniformity in the equipment that is used in each substation, as well as in all substations controlled by the company. While systems such as the Jindrick patent can be substituted for a substantial amount of tapchanger control structures in existing substations, a complete changeover would virtually be economically infeasible. Moreover, selective replacement would result in different transformers having different tapchanger controls. This makes it difficult to integrate the different type of controls, as well as maintain them. Different inventories of parts would be required, because repair must be complete and quick. Interruption of electrical service can be devastating to homes or businesses.

As previously discussed, the prime deficiency in electronic tapchanger controls like Jindrick is that they cannot control multiple transformers. More specifically, Jindrick requires an individual control for each transformer.

It is therefore a primary object of the present invention to provide a means and method for control of tapchangers for transformers which solves or overcomes the problems and deficiencies in the art.

Another object of the present invention is to provide a means and method as above described which allows flexible control of one or more tapchangers, whether the tapchangers are operated individually or in parallel.

Another object of the present invention is to provide a means and method as above described which utilizes a processor which can compare real time actual readings regarding performance of the transformer or transformers, and compare them to dynamic setpoints and ranges according to overall system operation.

A still further object of the present invention is to provide a means and method as above described which allows automatic adjustment of one or more transformer tapchangers according to variations in supply voltage or load.

A still further object of the present invention is to provide a means and method as above described which can detect malfunction or problems with the system.

A further object of the present invention is to provide a means and method as above described which presents a comprehensive system for reliably, efficiently, and economically operating transformer tapchanger controls.

Another object of the present invention is to provide a means and method as above described which efficiently minimizes circulating reactance vars in paralleled transformers, while at the same time maintaining regulation of voltage from the transformers.

Another object of the present invention is to provide a means and method as above described which eliminates a substantial amount of hardware required in conventional tapchanger controls.

Another object of the present invention is to provide a means and method as above described which eliminates imprecise and inefficient hunting for the correct voltage by tapchanger controls.

A still further object of the present invention is to provide a means and method as above described which allows tests and diagnostics to be accomplished during operation of the system, and provides fail safe mechanisms to insure the system is operating correctly.

Another object of the present invention is to provide a means and method as above described which reduces the amount of calibration and maintenance required for the tapchanger control system.

A still further object of the present invention is to provide a means and method as above described which is reliable, economical and durable.

These and other objects, features, and advantages of the present invention will become more apparent with reference to the accompanying specification and claims.

SUMMARY OF THE INVENTION

The invention utilizes an automatic control system to operate the tapchangers of power transformers for the purpose of regulating the supplied voltage to utility customers served by electrical substations. A processor scans voltage, watt, and volt-ampere reactive transducers to obtain the real-time load levels of up to four power transformers at an electrical substation. At the same time, the processor gathers the status of various breakers and operating conditions at the substation. The processor, through its software programming, makes decisions as to when and to what degree to operate the tapchangers.

The processor establishes a voltage setpoint for each operating transformer. This voltage setpoint is based on the present operating voltage, the real power flow through the transformer, the reactive power flow through the transformer, the rating of the transformer, and the switching conditions at the substation. The decision to operate the tapchangers is made when the real time operating voltage exceeds the calculated setpoint voltage, plus or minus the voltage bandwidth, but only when operating voltage has been out of bandwidth for a prescribed period of time.

When an operation is performed the processor outputs a raise or lower signal to the existing electromechanical tapchanger actuator for the correct power transformer for a programmed length of time. The processor will then wait a scan level interval before the next operation if required.

Electric substations have the capability of paralleling transformers by closing bus tie breakers. The status for these breakers is input to the processor. When a parallel condition between at least two transformers occurs, the processor initiates paralleling software to allow parallel operation of the transformers. If parallel transformers are not evenly matched in impedance, the transformers will circulate reactive power between each other. This circulating reactive power is wasted transformer capacity and increases energy losses. The processor reads the circulating reactive power from the connected transducers and moves any of the tapchangers of the paralleled transformers in directions that reduce the circulating reactive power to a minimum. With the circulating reactive power at a minimum, the processor will operate the tapchangers together in order to maintain minimum circulating reactive power. If the load level changes by a given amount, the processor will operate the tapchangers to again balance the circulating reactive power. The parallel software is designed to operate up to four transformers in parallel.

The application of a programmable control processor to control transformer tapchangers reduces wiring associated with paralleling transformers. The programmability allows very accurate voltage and power flow measurement, as well as flexible, yet reliable control over dynamic conditions. A single processor can control up to four transformers where present technology requires a control for each transformer. The presence of a programmable processor in an electrical substation allows avenues for other advantageous functions to be performed. For example, self-checking ongoing tests and diagnostics can be performed while the tapchangers are in operation. The invention offers features and flexibility not available with present controls.

BRIEF DESCRIPTION OF THE DRAWINGS

FIGS. 7-9 depict a flow chart for software control of the preferred embodiment of the invention.

DETAILED DESCRIPTION OF THE PREFERRED EMBODIMENT

To assist in a full understanding of the invention, a specific preferred embodiment of the invention will now be described in detail. It is to be understood that this description relates to one possible embodiment of the invention only, and is not inclusive of all forms and embodiments the invention might take. It is to be further understood that although this embodiment will be described with respect to a specific function within a specific electrical power transforming situation, it can be applied to analogous situations. The parts and values associates with this preferred circuitry and system, can also be substituted by equivalents or substantial equivalents, such as is known by those of ordinary skill in the art.

To further assist in this description, reference will be taken to the accompanying drawings. Certain parts, features, or locations in the drawings will be identified with reference numerals. The same reference numerals will be used for the same parts, features, or locations in all the drawings, unless otherwise noted.

This description will first begin with a general discussion of the components of the of preferred embodiment. It will then move to an increasingly specific description of the components and their interconnection. Finally, operation of the preferred embodiment will be discussed in conjunction with a description of the software programming associated with this embodiment.

Figures 1, 2, 3:
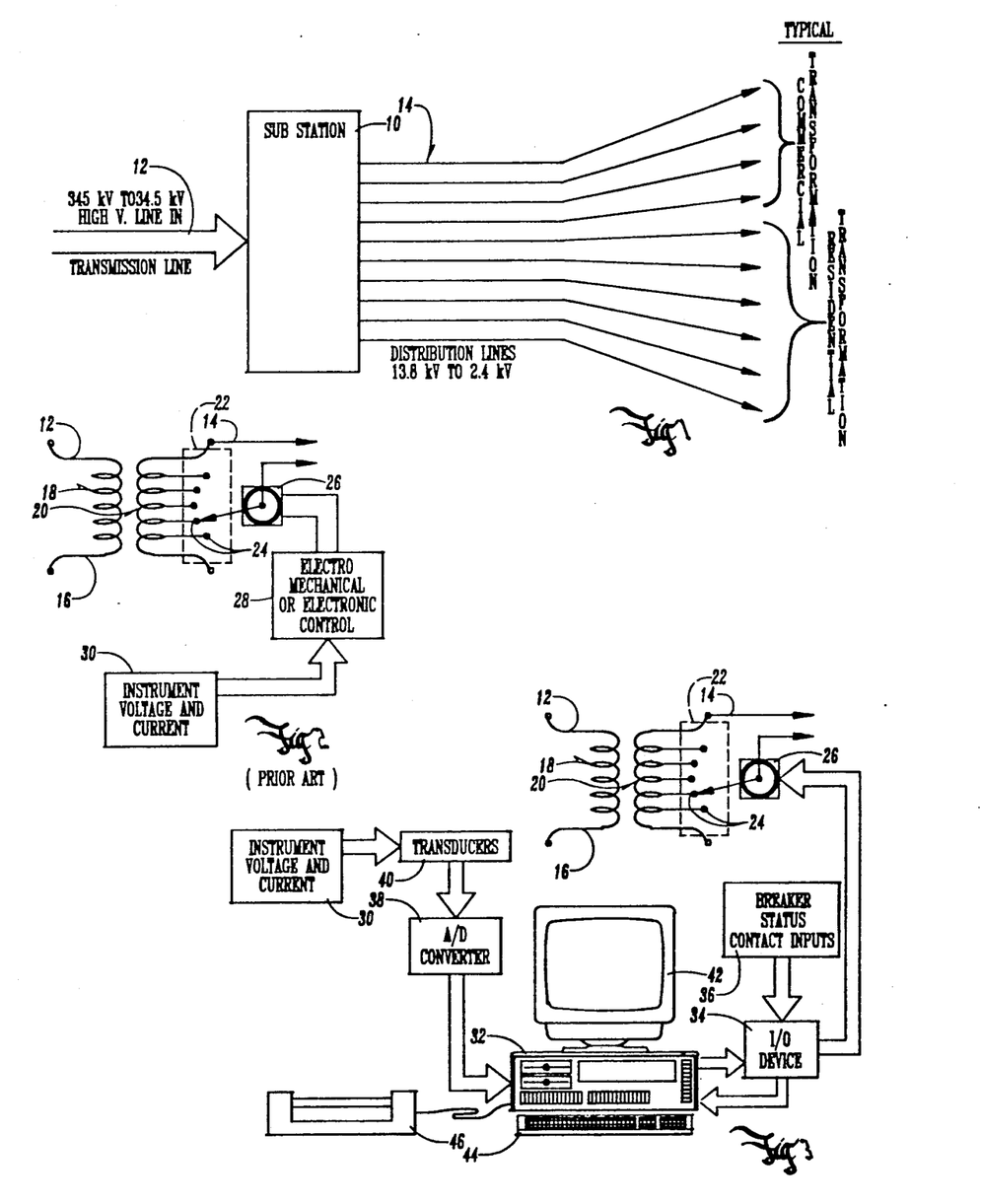
FIG. 1 is a simplified diagrammatical view of an electrical power distribution system.
FIG. 2 is a simplified schematic of a prior art tapchanger system.
FIG. 3 is a simplified schematic of a preferred embodiment of the present invention.

By referring to FIG. 1, a diagrammatical view of the function of the preferred embodiment is shown. Utility substation 10 is typically a fenced area containing transformers which convert the high power transmission line voltage (indicated at 12), to a much lower voltage (indicated at arrows 14). Substation 10 also serves to distribute transmission voltage 12 to a variety of locations geographically close to substation 10. As shown in FIG. 1, substation 10 can actually transform transmission voltage 12 into several different lower voltages, as is desired or required.

It is important to understand that each substation 10 is located remotely from the utility headquarters. The transformers and associated components of substation 10 therefore must be able to operate autonomously and continuously. Most substations do not have operators or maintenance personnel at the substation for other than periodic operational or maintenance checks. The importance of reliable substation activity can therefore not be underestimated.

The major function of substation 10 is to regulate output voltage 14 to keep it within prescribed limits. The major factors which need to be compensated for are changes in the incoming transmission voltage 12, or changes in load on the distribution lines 14 caused by changes in power consumption by consumers.

FIG. 2 diagrammatically and generally shows a widely used conventional method of regulating distribution voltage 14. Each transformer 16 includes what will be called a primary winding 18 and a secondary winding 20. Primary winding 18 is electrically connected with transmission voltage 12; whereas secondary winding 20 outputs distribution voltage 14. As is well known in the art, the ratio between windings 18 and 20 determines how the transmission voltage 12 will be transformed or converted to distribution voltage 14. By tapping into secondary winding 20 at various locations along winding 20, this ratio can be changed. This in turn can change distribution voltage 14. Therefore, a tapchanger (indicated generally at 22) is utilized to select between any number of taps 24 for secondary winding 20. By means well known in the art, an actuator 26, upon instruction, mechanically selects which tap 24 will be connected to output. Tapchangers 22 can be manually controlled, electrically controlled, or both. Current widely used state-of-the-art systems utilize an electromechanical or a discrete electronic control (indicated at 28). Control 28 changes the position of tapchanger 22 according to comparisons of readings from instrument voltage and current 30. Instrument voltage and current 30 reflect factors such as distribution line voltage and current and are the actual analog signals sent to control 28. Those signals are then compared to reference voltages and if the measured values do not come within preset limits of the reference values, control 28 instructs actuator 26 to "raise" or "lower" voltage 14 by incrementally stepping tapchanger 22 one way or the other until the measured voltage comes back into the acceptable reference range.

Systems similar to the prior art configuration of FIG. 2 have been previously described. A major disadvantage of these systems is their complete reliance on electrical and mechanical elements for operation. This requires extensive and periodic calibration and maintenance. The flexibility of such systems is also limited as to coping with the dynamic situations and many factors experienced at substation 10, as well as the change in performance of the components over time associated with such parts.

In essence, deterioration of electromechanical components and the change in performance of the components could be tolerable if there was some way to automatically compensate the system for those types of changes. One of the advantages of the present invention is to solve this need.

A diagrammatic, simplified depiction of the preferred embodiment of the present invention is set forth in FIG. 3. It first can be seen that a similar, if not identical, tapchanger 22 is utilized. Even actuators 26 and some of the conventional tapchanger control components can also be used with the preferred embodiment of the invention. Still further, several existing transducers 40 are utilized.

FIG. 3 shows a computer processor 32 is located on-site at substation 10. An input output (I/O) device 34 is installed in processor 32. Breaker status contact inputs 36 communicate information to I/O device 34. I/O device 34, at the direction of the processor, in turn sends instructions to actuator 26 for one or more tapchangers 22 (only one is depicted in FIG. 3).

An analog to digital (A/D) converter 38 is also installed in computer 32. A variety of transducers 40 communicate analog values to A/D converter 38, which are digitized and communicated for use to computer 32.

As indicated, a display monitor 42 (to view displays generated by software) can be connected to computer 32, as can keyboard 44 (to enter instructions or perform diagnostics), and printer 46 (to make hard copy records of data contained in processor 32).

The combination of elements in FIG. 3 therefore shows a number of breaker status contact inputs 36 and transducers 40 which provide information to processor 32. The information from the transducers is converted into a digital form usable by computer 32. Computer 32 then uses this information according to a software programming, to decide what instructions are sent to actuators 26 to either raise or lower tapchangers 22.

It will be understood that the preferred embodiment of the invention can control up to four tapchangers 22 simultaneously. It can control one to four transformers 16 individually for each or up to two sets of two transformers 16 connected in parallel. Therefore, throughout this description, though operation of the circuitry might be discussed with regard to one transformer and tapchanger, it is to be understood that the capabilities to control up to four (with some connected in parallel) is possible.

It will also be understood that the entire combination of FIG. 3 can be installed in conventional cabinets within substation 10. Known in the art electrical and computer connections and communication cabling can be used, and such will not be described in any detail.

Figure 4:
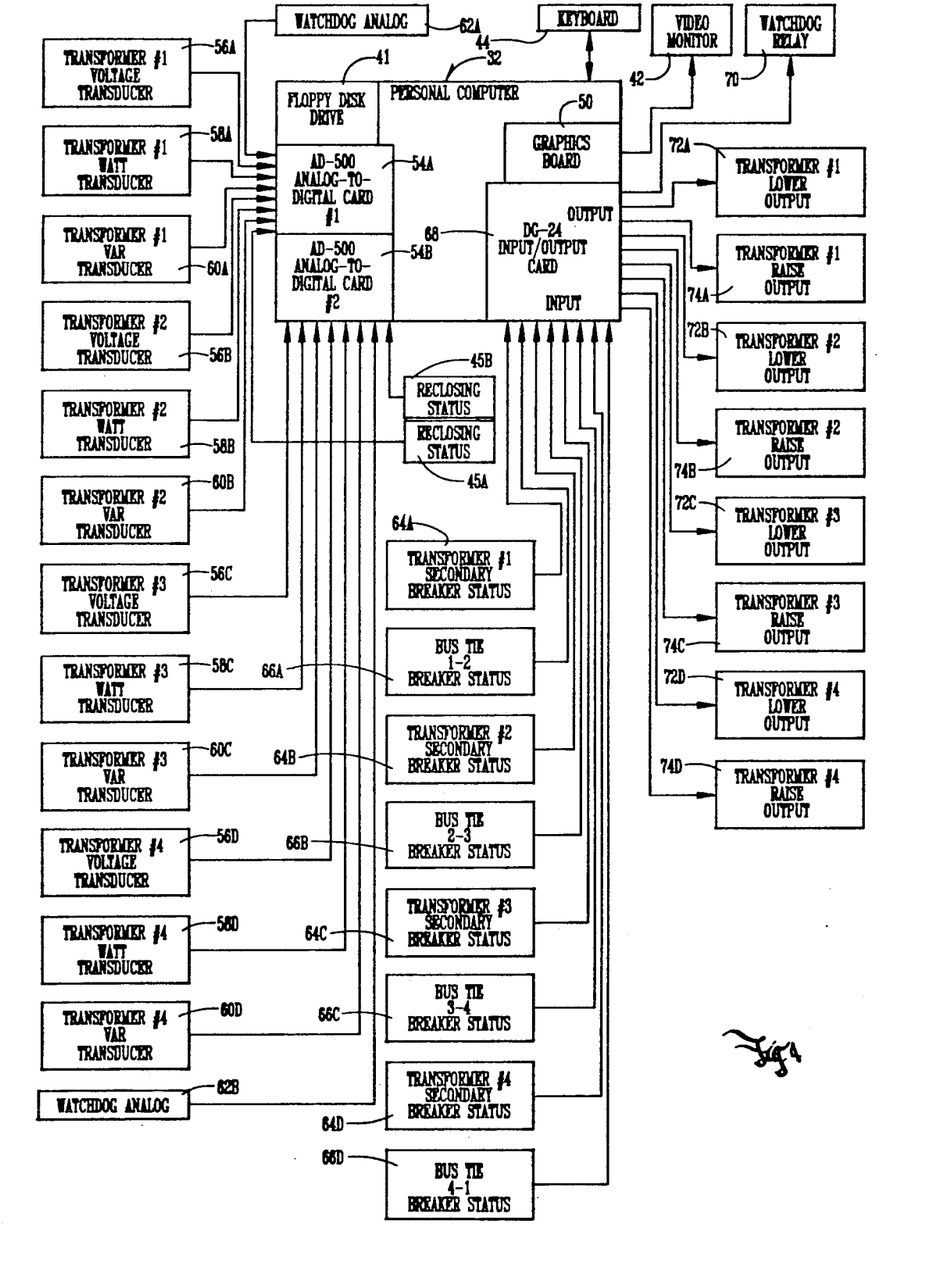
FIG. 4 is a block diagram of the invention.

FIG. 4 more specifically (in block diagram format) sets forth the general components of the preferred embodiment of the invention. Computer processor 32 is a ten megahertz (MHz) PC/XT compatible system based on the 8088-1 CPU and the AMI BIOS ROM; with capabilities for an optional 8087-1 math co-processor. This computer processor is available from Jameco Electronics of Belmont, Calif. 94002 under product designation JE1002.

As configured, computer 32 has 256K of memory and a 360K floppy disk drive. It will actually operate software in either the 4.77 MHz or 10 MHz mode. As is obvious, any XT, AT, or 386 processor-based computer could also be utilized.

Card slots in the computer mother board for computer 32 are utilized as follows:

1. Floppy disk drive 41—floppy disk controller which handles 360K, 720K, 1.2M, and/or 1.44M drives (larger capacity drives or a hard disk could be implemented with computer 32 if it is desired to log data over time).

2. Graphics board 50—monochrome display adapter enabling connection of video monitor 42.

3. AD-500 A/D card 54a—eight channel multiplexed analog-to-digital converter digitizes 13 kV bus voltages (see voltage transducers 56 a, b, c, and d), transformer megawatts (see watt transducers 58 a, b, c, and d), and transformer reactive power in megavars (see var transducers 60 a, b, c, and d); and receives, as input signals reclosing input status 45A.

4. AD-500 A/D card 54b—identical to A/D card 54a. Needed only if more than two transformers are being controlled because of limited number of input points per I/O card. Each card 54a and b also receives readings from watchdog analog devices 62a and b.

5. DG-24 I/O card 68—receives as input status signals (open or closed) from secondary and bus tie breaker status devices 64a–d and 66a–d; and sends as output "lower" or "raise" signals to output devices 72a–d and 74a–d, as well as signals to watchdog relay 70.

As previously stated, the system of FIG. 4 can operate up to four transformers (referred to as transformers #1-4). Each A/D card 54a and 54b has eight available input channels. In the preferred embodiment cards 54a and 54b are A/D 500 data acquisition system analog interfaces used to digitize output voltages of transducers. The A/D 500 is available from Real Time Devices Incorporated, 1930 Park Forest Avenue, P.O. Box 906, State College, Pa. 16804, and is an eight channel 12 bit analog interface board based on the ICL7109 CMOS A/D converter and designed for use in an IBM PC/XT/AT or IBM compatible computer. Input from each voltage transducer 56, watt transducer 58, and var transducer 60 requires a separate channel on card 54a or b. Therefore, each card 54a or 54b can handle voltage, watt, and var transducer inputs from two transformers; which will take up six channels.

The analog values from transducers 56, 58 and 60 are in the range of plus/minus five volts DC and are then digitized into plus/minus 4095 bits. If the system is used to control more than two transformers, the second A/D card 54b must be used and allows a third and/or fourth transformer to be controlled.

The remaining two channels on each card 54a or 54b are used in the preferred embodiment as follows. The seventh channel is left available to be connected to a transducer to record primary voltage supplied to the transformers. The eighth channel monitors input from what is called the "watchdog analog value", which will be described in more detail later. The watchdog analog device is referred to by reference numeral 62A for A/D card 54a, and 62B for A/D card 54b.

A set of contact input devices also provides input to processor 32. As shown in FIG. 4, secondary breaker status monitors 64a–d provide voltage signals indicating the status of secondary breakers for transformers numbers 1–4 to input channels on I/O card 68. Additionally, the status of bus tie breakers, between transformers numbers 1 and 2, 2 and 3, 3 and 4, and 4 and 1, are input to I/O card 68 from signals generated by bus tie breaker status devices 66a–d. Processor 32 therefore has continuous real time knowledge of whether any of these breakers are open. If so, computer 32 can instruct the system accordingly.

Essentially secondary breaker and bus tie breaker status devices 64a–d and 66a–d, along with I/O card 68, read bus tie and transformer secondary circuit breaker status. If any breaker is open, the system may be instructed not to raise or lower any of the transformer tapchangers.

FIG. 4 also shows nine outputs from I/O card 68. Four of the outputs go to devices 72a–d each of which can send a "lower" instruction signal to a tapchanger control to cause it to lower the voltage supplied by that transformer. Four of the outputs go to devices 74a–d each of which can send out a "raise" signal when instructed, to raise the output voltage of a transformer. Devices 72a–d and 74a–d basically are the interfaces between the processor 32 and the existing tapchanger controls for transformers #1–4. They instruct the tapchanger controls as to what direction to move the tapchanger, as well as how much and how quickly. These instructions depend on the process instructions generated by processor 32.

It can therefore be seen that the system according to the invention monitors a number of different parameters of the electrical system continuously in real time. These parameters are analyzed and processed in computer 32. On the basis of this analysis and processing, computer 32 generates the signals which can direct any of the transformers #1–4 to have their respective tapchangers remain at the present location, or be raised or lowered. It can raise or lower tapchangers individually or in combination. The system is therefore quick, comprehensive, and accurate. It relies on the accurate and real time integration of monitored performance of the system and control of the system.

Input/output card 68, in the preferred embodiment, is a DG24 digital I/O interface available from Real Time Devices Inc., 1930 Park Forest Avenue, P.O. Box 906, State College, Pa. 16804. It utilizes an 8255 programmable peripheral interface (PPI) chip and allows control or monitoring of 24 digital I/O signals. It can be installed into an IBM PC/XT/AT or any compatible computer.

Figure 5:
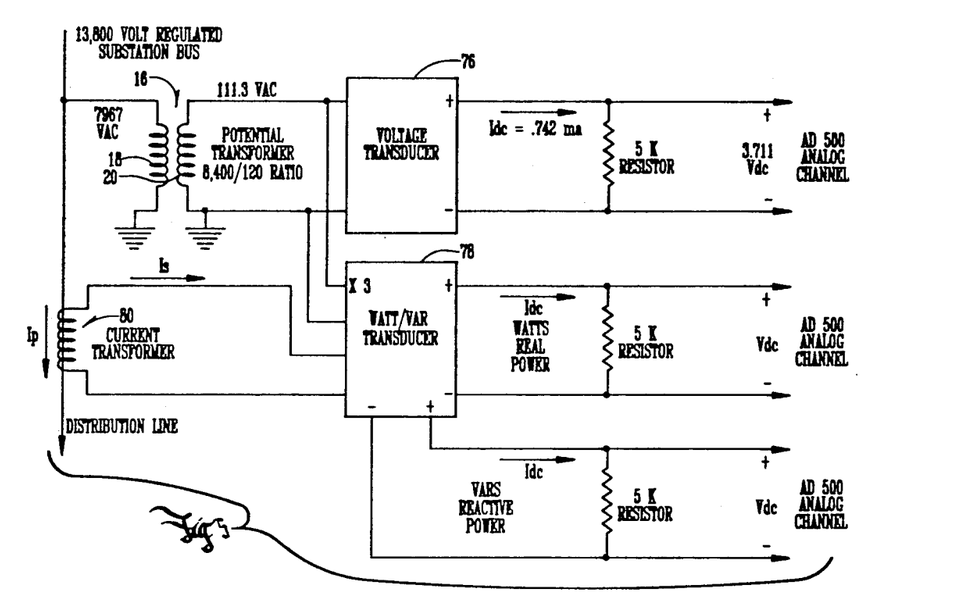
FIG. 5 is an electrical schematic of a portion of the preferred embodiment of the present invention.
Figure 6:
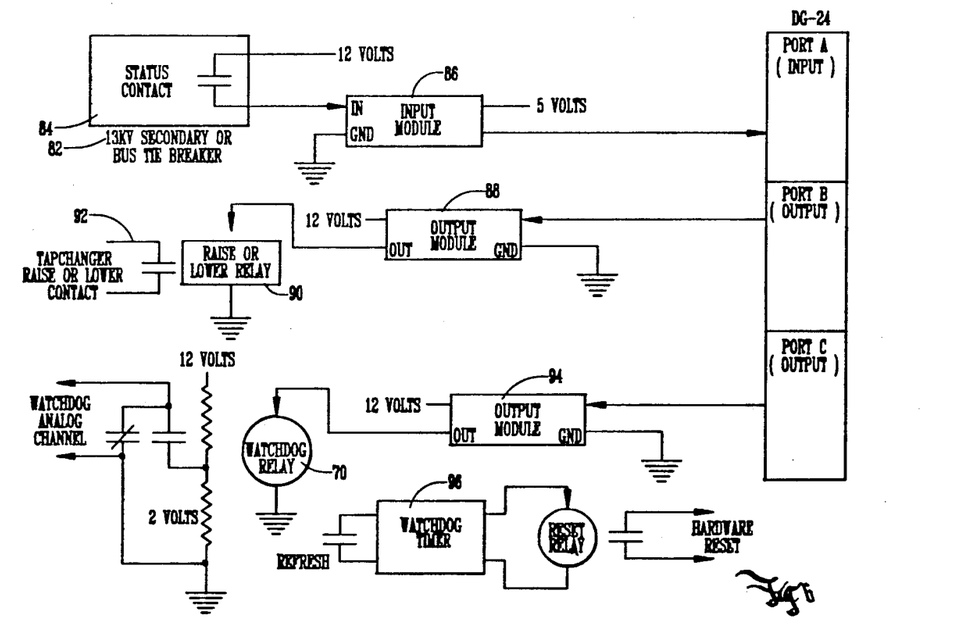
FIG. 6 is an electrical schematic of another portion of the preferred embodiment of the present invention.

FIGS. 5 and 6 show in more detail the exact relationship between input and output to computer 32. FIG. 4 shows how voltage, watt and var readings are monitored and input into computer 32. A voltage transducer 76, such as is known in the art, is connected to secondary winding 20 of transformer 16. The 13,800 volt regulated voltage bus provides 7967 VAC line to ground voltage to primary winding 18. Transformer 16, in the preferred embodiment, is a potential transformer having an 8,400 to 120 winding ratio, which normally produces 111.3 VAC to the voltage transducer 76. Voltage transducer 76 measures the potential across secondary winding 20 depending on the tap setting thereof. Transducer 76 converts the AC voltage to a reading between 0 and 5 VDC. This reading is directly proportional to the actual voltage supplied to the distribution line. As shown in FIG. 5, this VDC reading is then input into a channel of A/D card 54a or 54b. A/D card 54a or b then takes the VDC reading between 0 and 5 volts and converts it into a digital quantity. That digital quantity is then available to processor 32.

Watt and var readings utilize a watt/var transducer 78 having a first set of inputs measuring the voltage across secondary winding 20. A second set of inputs are connected to current transformer 80 which measures the current in the distribution line. As is known in the art, transducer 78 then outputs a VDC signal directly corresponding to actual watts real power which is input into A/D 54 card a or b, and is then available to processor 32. Similarly, transducer 78 outputs a VDC signal directly proportional to vars reactive power, which is input into A/D card 54a or b and is available to processor 32.

FIG. 6 similarly depicts how secondary breaker or bus tie breaker status devices 64a–d and 66a–d operate; as well as how devices 72a–d and 74a–d operate. A single 13 kV secondary or bus tie breaker 82 is depicted in FIG. 6 as an example. These breakers are protection devices for the circuitry. The status contacts 84 are associated with breakers 82, as is known in the art. Status contacts 84 indicate whether a breaker 82 is open or closed. Depending on convention, status contact 84 either sends a 12-volt signal to an input module 86, or sends no signal to input module 86. Input module 86, in turn, operated by 5 VDC, will issue a signal to the input port of I/O card 68 corresponding to whether or not a 12-volt signal was received from status contact 84. This allows processor 32 to know whether the particular secondary or bus tie breaker is open or closed.

In a reverse but similar manner, I/O card 68 issues a signal to output module 88, which in turn issues a signal to either a raise or lower relay 90. Upon operation, relay 90 raises or lowers the tapchanger through closing contact 92. Contact 92 in turn would operate the appropriate electromechanical apparatus of the transformer tapchanger.

FIG. 6 also shows in more detail electronic circuitry for watchdog analog devices 62a and b and watchdog relay 70. The function of the watchdog components is to monitor operation of the system. If any malfunction or prescribed situation regarding the system occurs which requires cessation of operation of the tapchanger control system, watchdog elements will effectuate interruption of operation, and even produce an alarm if desired.

Output port C of I/O card 68 of processor 32 is connected to output module 94, as shown in FIG. 6. Output module 94 closes or opens watchdog relay 70 with a 12-volt signal, when so instructed by processor 32.

Watchdog analog devices 62a and b input a signal into A/D cards 54a and b. When the watchdog relay 70 is de-energized, signal ground volts DC from the watchdog analog device 62a or b is switched to the input of I/O card 68. When watchdog relay 70 is energized, two volts DC is switched into the watchdog analog channel. AD-500 54a–b monitors feeder circuit reclosing relays and blocks tapchanger operation when a feeder circuit has reclosing in progress. The card 54A also outputs an alarm if the control system or its inputs are malfunctioning.

All the inputs and outputs on card 68 are isolated by standard optically isolated input/output modules. The modules provide 4 kV transient protection and serve as a voltage transition from computer signals to control voltages. These modules have terminal strips to facilitate the landing the external wiring.

FIG. 6 also shows that a 30 to 300 second timer relay is used for watchdog timer 96. Timer 96 is pulsed when a programed number (level) of analog scans is completed. The computer is automatically rebooted if the watchdog timer 96 is allowed to drop out. A supervisory alarm alerts personnel if the watchdog timer 96 continues to reboot without successfully returning to automatic computer control.

Figure 7:
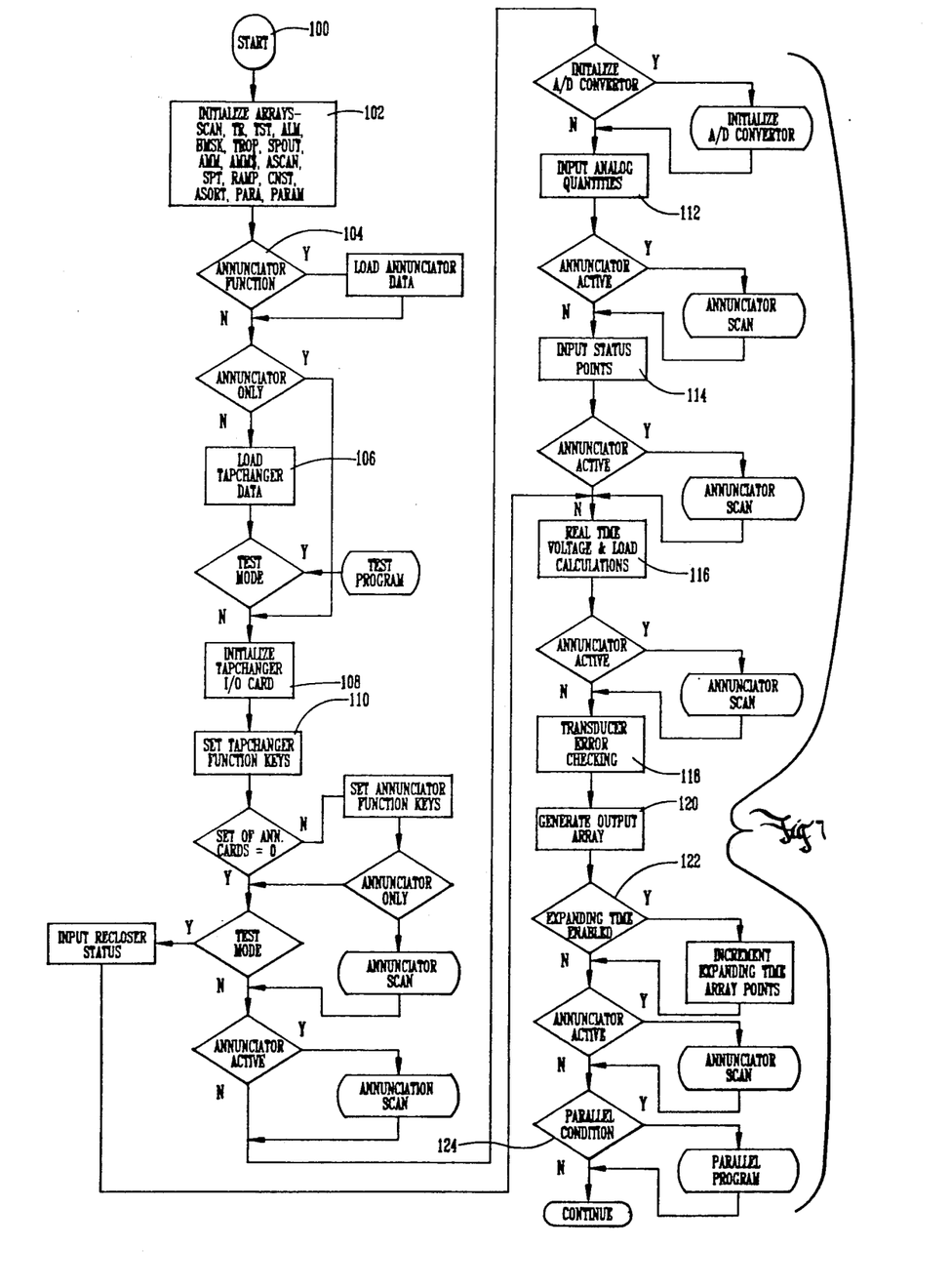
Figure 8:
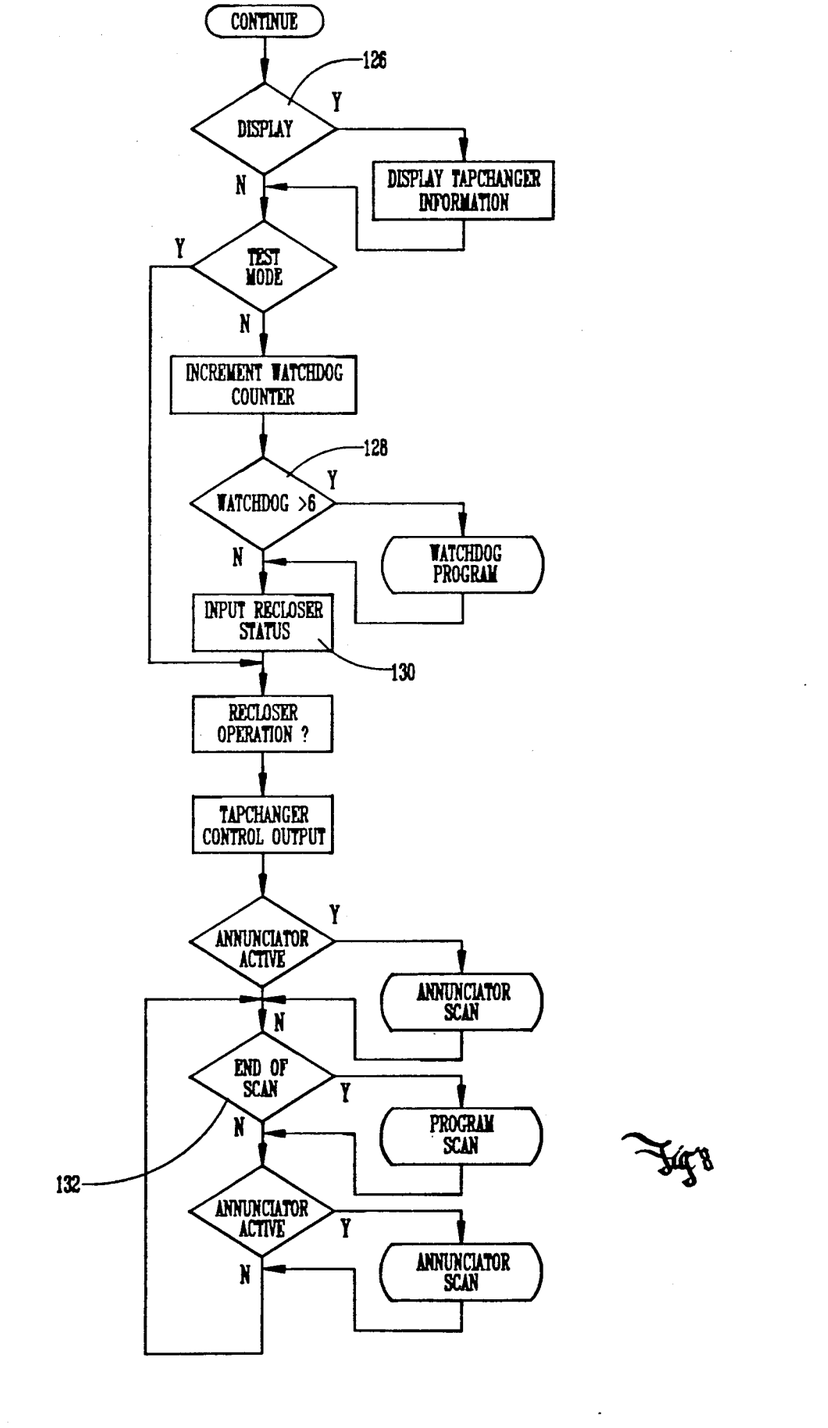

The specific operation of the above-described preferred embodiment will now be set forth with reference to FIGS. 7-9. FIGS. 7-9 contain the preferred embodiment of a flow chart for the software utilized by processor 32.

It is to be understood that the software for the preferred embodiment is written in compiled Basic computer language. Computer 32 operates on Microsoft MS-DOS. The system automatically boots from floppy disk and loads the software.

The program uses two data files to configure the control system; first, a parameter file, and secondly, a constant file. The parameter file contains information on the number of transformers to be controlled, the I/O board addresses, the scan interval in seconds, the number of A/D converters, the data recording interval, and whether auxiliary functions are implemented.

In FIG. 7, the personal computer loads 100 (the tapchanger control software) from floppy disk when the power is turned on or a hardware reset is initiated from the watchdog hardware. The computer loads the operating software and the control software. The software establishes a number of arrays 102 in memory to facilitate the shuffling and the manipulation of data. The program then determines if any other functions are to be performed (see reference no. 104).

The program obtains information on transformer size and substation configuration by loading the transformer data base 106. Referring to Table A which set forth later in this description, information in this data base includes transducer conversion constants, transformer size, control enables, scan times, bandwidth settings, voltage limits, setpoint slope multipliers, and output duration times.

The output cards are initialized to configure the input/output ports (see reference no. 108). The software assigns certain displays to function keys to provide test, diagnostic, and exit functions (see 110).

The computer scans (112) the AD-500 to determine the bit values of voltage, power, and reactive power for each transformer under control. The computer then scans (114) the DG-24 for input status on the secondary and bus tie breakers. These values are placed into the scan array.

With the real time quantities stored in the scan array, the computer calculates (116) the analog quantities in engineering units using the constants stored the constant array. The computer first checks for parallel status and flags a parallel condition. The voltage, real power, reactive power, and total voltampere is calculated. The adjusted power is calculated using the resistive multiplier in the constant array. The adjusted reactive power is also calculated using the ± reactive power multiplier. From these two adjusted values is derived the adjusted volt-ampere loading of the transformer.

The adjusted volt-ampere loading is used to calculate the voltage setpoint. The voltage bandwidths are established by adding the upper bandwidth constant to the setpoint. Likewise the lower bandwidth is established by subtracting the lower bandwidth constant from the setpoint. If the upper bandwidth voltage exceeds the maximum allowed voltage, the highest voltage constant is substituted for the upper bandwidth voltage. If the lower bandwidth voltage is less than the lowest voltage constant, the lowest voltage constant is substituted for the lower bandwidth voltage.

Transducers are checked for unreasonable values (118). If the voltampere read from the transducer exceeds 25% of the transformer rating, a value of 75% of the transformer rating is entered as a real power quantity and a value of zero for the reactive quantity. If the real power of the transformer exceeds 110% of the transformer, a value of 75% of the transformer rating is substituted. A reactive power value of 110% causes a zero to be entered for the reactive power reading. A voltage value of less than 12,500 volts inhibits tapchanger operation for that tapchanger. All transducer substitution conditions and/or the disabling of the tapchanger control system initiates an alarm.

The program checks the scan number against the scan level to determine whether an output is permitted (120). If the scan number equals the scan level then the correct output is placed into the output byte.

The expanding time function is evaluated (122). If enabled the scan number is increased according to the inactivity of the tapchanger. The time required for the voltage to be out of bandwidth before an operation is made is increased to a maximum value of (96×the scan time). This function is designed to reduce tapchanger operations by ignoring transient voltage fluctuations.

The computer now checks for a parallel condition (124). If none is found and the display is not being used for other functions, the diagnostic screen (FIG. 8) will be shown (126) on the computer monitor 42. The computer then verifies if six scans have been completed. If this condition is satisfied (128) the watchdog timer is pulsed by the watchdog relay.

The circuit recloser-in-operation status (130) is input to determine if tapchanger outputs should be allowed. Outputs will be enabled for those tapchangers without active circuit reclosing in progress. The end of scan (132) is determined by a programmable constant. When the elapsed time from start of scan reaches this value, the program jumps to the beginning of the program scan.

The parallel program is run when the parallel condition is satisfied (124). Parallel parameters are set (FIG. 9) (140) with each entry into the parallel program. Various combinations of secondary and bus tie breakers are tested to develop the parallel configuration. Each pass through the program is tested (142) to see if a parallel operation evaluation is needed. After six scans, the program displays the scan status of each paralleled transformer (144). The parallel evaluation data including transformer identification, previous and present absolute reactive power, previous and present combined voltamperes, and previous tapchanger output status are displayed (144).

The program determines the real time parallel condition (146) and performs the following:

Displays the impending parallel status (148).

Sorts transformers by largest reactive power (150). On the first output to parallel tapchangers (152), the computer operates the tapchangers to reduce circulating reactive power by lowering the tapchanger on the transformer with the highest reactive power flowing out of the transformer. The computer sends raise commands to all other transformers paralleled. On subsequent passes, the computer compares the present absolute reactive power to the previous absolute reactive power. If the present absolute reactive power is less than the previous, the tapchangers are operated to reduce circulating reactive power. Once the present absolute reactive power is larger than previous, the balance point has been reached. At this point the tapchangers are locked and receive the same output directions.

On each pass through the output portions of the parallel program the previous and present MVA loading are compared (154, 156). If a 5 MVA (two transformer) or a 7 MVA (three-four transformer) change has occurred, the tapchangers are unlocked (158,160) and the circulating reactive power is balanced again.

The results of the parallel evaluation are displayed on the monitor for 4 seconds prior to output (162). Any outputs for parallel transformers derived by normal scan are overwritten by the parallel program. Any transformer on independent is ignored. The software then returns to the main part of the program (164).

The constant file contains information about each transformer and how it is to be controlled. An example is shown at the following Table A.

For example if Transformers #1 and #2 can be paralleled, a "1" is placed in column six, row one. Transformers #2 and #3 can be paralleled by placing a "1" in column six, row two.

Column seven is the entry for the "Expanded Time Enable". When enabled the control does not always operate with the same output delay interval. If the bus voltage has remained in the bandwidth for the minimum non-sequential time period, the control will double that time period for the next scan cycle. The control keeps expanding the time intervals up to five minutes. If the voltage exceeds the bandwidth for the expanded time period, an operation occurs and the time delay is reset to the minimum time period.

Column eight is the "Scan Level Setting". This value, in combination with the scan interval, set the time period between operations (non-sequential interval). For instance, if the scan interval is five seconds and the scan level is six, the non-sequential time period is thirty seconds. Each transformer can have its own time period; however, the time period for parallel operation is fixed at thirty seconds.

Columns nine and ten set the "Low and High Side Bandwidths". The values utilized are expressed at the transformer's primary voltage. The primary voltage resolution is five volts.

Columns eleven and twelve establish the "lowest and highest permissible voltages" respectively. These values serve as absolute limits where the control is prohibited from operating. These values supersede bandwidth limits and produce tapchanges that maintain the bus voltage within these permissible limits.

Columns thirteen through fifteen correspond to the conventional resistive (R) and reactive (X) load compensation settings on tapchanger controls. These numbers change the slope of the linear function between no-load and peak-load. Numbers larger than one magnify the effect of that quantity on the linear function. Numbers less than one reduce the influence. Values of one result in a slope of one for the linear function to maximum setpoint. Negative numbers invert the influence.

| " VOLTAGE | CONSTANTS FOR TRANSFORMERS (SUBSTATION 40) | | | | PARALLEL SCHEME | TIME EXPAND | SCAN LEVEL | LOW SIDE BANDWIDTH |
|---|---|---|---|---|---|---|---|---|
| | MW | MV | TR. SIZE | VOLT. SET | | | | |
| 4.44225, | .0093470, | .0077892, | 26, | 13350, | 1, | 0, | 6, | 200, |
| 4.44225, | .0124627, | .0103856, | 26, | 13350, | 1, | 0, | 8, | 200, |
| 4.44225, | .0123322, | .0102788, | 33, | 13350, | 1, | 0, | 5, | 200, |
| 4.44225, | .0123322, | .0102788, | 26, | 13350, | 1, | 0, | 6, | 200, |

| " VOLTAGE | HIGH SIDE BANDWIDTH | LOWEST VOLTAGE | HIGHEST VOLTAGE | RESIST. MULT. | +VAR MULT. | −VAR MULTI. | OUT-" TIME" |
|---|---|---|---|---|---|---|---|
| 4.44225, | 200, | 13250, | 13800, | 1, | 1, | .5, | 2 |
| 4.44225, | 200, | 13250, | 13800, | 1, | 1, | .5, | 1 |
| 4.44225, | 200, | 13250, | 13800, | 1, | 1, | .5, | 2 |
| 4.44225, | 200, | 13250, | 13800, | 1, | 1, | .5, | 2 |

The first three columns contain transducer constants for up to four transformers. Each row represents the constants for a particular transformer. Column four lists the transformer size in MVA. This value is used to determine erroneous transducer output readings.

Column five contains the "No-Load Voltage Setpoint". Each transformer can be set individually. This value will be biased upwards as transformer load increases.

Column six contains the "Parallel Enable" parameter. This determines which transformer may be paralleled.

Column sixteen sets the output duration for each transformer operation. Different transformers may require different timing outputs. This eliminates misoperations from either not moving or moving two taps.

It will be appreciated that the present invention can take many forms and embodiments. The true essence and spirit of this invention are defined in the appended claims and it is not intended that the embodiment of the invention presented herein should limit the scope thereof.

What is claimed is:

1. Means for controlling operation of one or more tapchangers, each associated with a power step-down transformer having primary and secondary sides for reducing and regulating voltage at an electrical power substation from transmission line power at the primary side of the transformer to residential and business distribution line power at the secondary side of the transformer which is connected to a distribution bus for distribution of step-down voltage to one or more distribution lines, the distribution bus including switching devices to open or close electrical communication between the secondary side of the transformer and the distribution bus and between portions of the distribution bus, each tapchanger movable with respect to a secondary coil of the transformer in response to electromechanical actuation by a tapchanger control which moves the tapchanger in response to an electrical control signal, the improvement comprising:

- transducer means for monitoring characteristics of transmission line power and distribution line power, including voltage, three-phase watts or real power, vars or reactive power, and converting those characteristics into digital signals;
- status means for monitoring said switching devices and providing status signals regarding the open or closed condition of the electrical communication between the secondary side of each transformer and the distribution bus and between portions of the distribution bus;
- data storage means for storing information relating to evaluation of the characteristics and to comparison of the characteristics to desired values or ranges of values;
- processing means for obtaining the characteristics and information from the transducer means, the status means, and the data storage means, and for processing and comparing the same according to programming, and for generating said electrical control signal; and
- output means for communicating the electrical control signal to each transformer tapchanger control.

2. The means of claim 1 wherein the transducer means comprises voltage, wattage, and reactive power transducer means.

3. The means of claim 1 wherein the data storage means comprises means which can be interchangeable and substitutable into the processing means.

4. The means of claim 1 wherein the data storage means includes parameter information and constant information.

5. The means of claim 4 wherein the parameter information includes number of transformers to control, input/output board addresses, scan intervals, number of analog to digital converters, and data recording interval.

6. The means of claim 4 wherein the constant information includes constants used in creating engineering values for transducer values, as well as transformer size, voltage set points, transformer paralleling information, scan level, bandwidths, high and low voltage limits, low compensation, and output duration.

7. The means of claim 4 wherein the data storage means comprises a magnetic computer disk.

8. The means of claim 1 wherein the processing means comprises a computer means including input/output means and analog to digital means.

9. The means of claim 1 wherein the output means includes a signal generating means to produce the electrical control signal.

10. The means of claim 1 further comprising transient protection means for the processing and output means.

11. The means of claim 1 further comprising optical isolation means for the processing means.

12. The means of claim 1 further comprising connection means for a video display means.

13. The means of claim 1 further comprising connection means for keyboard means.

14. A method of automatically controlling operation of tapchangers for step-down transformers at an electrical power substation where each transformer is a part of a circuit including distribution bus means and bus tie breaker means comprising:

- monitoring in real time distribution voltage across a secondary winding of each step-down transformer which reduces voltage from a high power transmission line;
- monitoring in real time electrical power flow, including real and reactive power, in said distribution bus means connected to the secondary windings of the step-down transformers, and converting monitored power flow measurements into digital bit values;
- monitoring in real time each bus tie breaker means to determine interconnection status of each transformer in the substation, and communicating the interconnection status of each transformer to a processing means;
- converting, in approximately real time, the digital bit values of real power and reactive power into engineering units representing said power flow through said distribution bus means;
- communicating said engineering units to the processing means;
- communicating predetermined desired limit values for power substation operation to the processing means, and criteria for analyzing acceptable power substation operation;
- comparing actual power substation operation with the desired limit values; and
- generating a control signal if the comparison does not meet the criteria, the control signal causing one or more selected tapchangers for one or more selected transformers to alter its position to alter operation of said one or more selected transformers.

15. The method of claim 14 wherein the monitoring and calculating allows derivation of voltage, watt power, and reactive power levels.

16. The method of claim 14 further comprising the step of simultaneously monitoring and controlling a plurality of transformers.

17. The method of claim 14 comprising multiplying voltage, real power, and vars reactive power by constant values to obtain values which can be used to create engineering values for those quantities.

18. The method of claim 14 wherein the monitoring is accomplished by repeated scanning.

19. The method of claim 18 wherein the scanning is accomplished a period of several seconds.

20. The method of claim 18 comprising the step of scanning the status of breaker means associated with the substation buses.

21. The method of claim 14 further comprising additionally monitoring distribution line voltage and breaker reclosure operation.

22. The method of claim 14 further comprising analyzing the parallel condition of any transformers to determine and minimize reactive power losses between any parallel transformers.

23. The method of claim 22 further comprising adjusting parallel transformers in an active condition to minimize reactive power loss.

24. The method of claim 22 comprising locking parallel transformers to operate in parallel.

25. The method of claim 22 comprising controlling whether the transformers are connected in parallel in a locked state or whether tapchangers for the transformers are adjusted relative to one another to reduce reactive power loss in an active state.

26. The method of claim 14 comprising checking system operation periodically, an resetting a timer if system checks out, operation is appropriate, and if the system operation is not appropriate, reinitializing the method.

27. The method of claim 14 wherein the generation of the control signal is controlled to set the timing of issuance of the control signal and the content of the control signal.

28. The method of claim 14 further comprising checking to see if the voltage, watt, and vars reactive power readings are within acceptable limits, and if not, altering operation of the method.

29. A supervisory means for automatically operating a transformer tapchanger control of an underload tapchanger for an electrical power substation transformer comprising:
   bus means for connecting the transformer to other circuitry, which can include other transformers;
   bus breaker means for opening or closing electrical contact between parts of the circuitry;
   transducer means for monitoring parameters associated with the transformer, including but not limited to load voltage, real power and reactive power;
   status means for monitoring whether the bus breaker means has opened or closed electrical contact between parts of the circuitry;
   programmable means for establishing desired values including but not limited to desired output voltage of the transformer and allowable range for output voltage of the transformer;
   processing means for reading the transducer means, the status means, and programmable means, and analyzing whether instructions should be generated to change the transformer tapchanger; and
   output means for communicating any instructions from the processing means to the tapchanger control, the instructions causing the tapchanger control to adjust the transformer tapchanger.

30. A method for controlling tapchangers for a plurality of electrical substation power transformers each connectable by secondary breaker means to a distribution bus means from which distribution feeder lines extend, and each connectable individually or in parallel by bus tie breaker means with another transformer to distribution feeder lines comprising the steps of:
   loading operation information in digital form onto an information storage means, the operation information relating to desired operational parameters of the transformers individually and collectively, including instructions regarding alteration of operational parameters based on certain changing conditions experienced by the transformers individually or collectively;
   communicating a digital processor means through an analog/digital converter with a tapchanger control means for the tapchanger of each transformer, the tapchanger control means adjusting the position of the tapchanger to raise or lower the transformer output according to an analog instruction signal;
   installing the information storage means onto the processor means which can read and perform operations in response to the digital operation information on the storage means;
   monitoring actual operation of the transformers by using transducer means to derive at least voltage, real power, and reactive power values associated with the transformers for any given time;
   monitoring the bus tie and secondary breaker means associated with the transformers to determine interconnection status of the transformers with the distribution bus and each other at any given time;
   reading the actual operation data for a given time or time period and processing the data according to the calculations contained in the operation information to derive engineering quantities which can be related to the operation parameters of the operation information;
   checking for system errors;
   scanning the operation of all transformers, including the monitoring of actual operation of the transformers and the monitoring of bus tie and secondary breaker means, and storing the data in a memory means;
   calculating operation parameters based on the scanning to determine present conditions of the system;
   comparing the present condition data in the processing means with the operation parameters on the information storage means;
   altering the operation parameters with respect to the preset conditions; and
   issuing instruction signals to each tapchanger control means to control and regulate the transformer output of each transformer to automatically control individual and composite transformer output.

* * * * *